(12) United States Patent
Kato et al.

(10) Patent No.: US 7,620,849 B2
(45) Date of Patent: Nov. 17, 2009

(54) FAULT RECOVERY SYSTEM AND METHOD FOR ADAPTIVELY UPDATING ORDER OF COMMAND EXECUTIONS ACCORDING TO PAST RESULTS

(75) Inventors: Kiyoshi Kato, Tokyo (JP); Ryuichi Hiraike, Tokyo (JP)

(73) Assignee: NEC Corporation, Tokyo (JP)

( * ) Notice: Subject to any disclaimer, the term of this patent is extended or adjusted under 35 U.S.C. 154(b) by 1118 days.

(21) Appl. No.: 10/893,443

(22) Filed: Jul. 16, 2004

(65) Prior Publication Data

US 2005/0015665 A1    Jan. 20, 2005

(30) Foreign Application Priority Data

Jul. 16, 2003    (JP)    ............... 2003-275107

(51) Int. Cl.
*G06F 11/00* (2006.01)
(52) U.S. Cl. ........................................................ 714/26
(58) Field of Classification Search ................... 714/26; 706/47

See application file for complete search history.

(56) References Cited

U.S. PATENT DOCUMENTS

| | | | | |
|---|---|---|---|---|
| 5,404,503 | A * | 4/1995 | Hill et al. ........................ | 714/31 |
| 6,145,096 | A * | 11/2000 | Bereiter et al. ................. | 714/25 |
| 6,357,017 | B1 * | 3/2002 | Bereiter et al. ................. | 714/27 |
| 6,411,947 | B1 * | 6/2002 | Rice et al. ....................... | 706/47 |
| 6,658,598 | B1 * | 12/2003 | Sullivan ......................... | 714/25 |
| 6,681,344 | B1 * | 1/2004 | Andrew ......................... | 714/38 |
| 6,738,928 | B1 * | 5/2004 | Brown ........................... | 714/26 |
| 6,877,115 | B2 * | 4/2005 | Herman ......................... | 714/46 |
| 7,100,085 | B2 * | 8/2006 | Miller ............................ | 714/26 |
| 7,130,770 | B2 * | 10/2006 | Di Palma et al. ............. | 702/186 |
| 7,209,860 | B2 * | 4/2007 | Trsar et al. .................... | 702/183 |

FOREIGN PATENT DOCUMENTS

| | | |
|---|---|---|
| JP | 02-137035 | 5/1990 |
| JP | 02-194437 | 8/1990 |
| JP | 03-144831 | 6/1991 |
| JP | 7-54474 | 6/1995 |
| JP | 2002-251295 | 9/2002 |
| JP | 2002-342184 | 11/2002 |
| JP | 2004-326764 | 11/2004 |
| JP | 2006-500654 | 1/2006 |

* cited by examiner

*Primary Examiner*—Robert Beausoliel
*Assistant Examiner*—Elmira Mehrmanesh
(74) *Attorney, Agent, or Firm*—Scully, Scott, Murphy & Presser, P.C.

(57) ABSTRACT

In a memory a number of entries are defined for mapping reference symptom levels of a server to fault restoration commands and to priority levels. In response to a status report from a fault detector indicating an operating state of the server, one of the commands is selected according to the priority levels corresponding to the reported state. The selected command is executed, and a result of the execution is estimated. In response to a subsequent status report, a comparison is made between the estimated result and an operating state indicated in the report. The priority levels are updated according to the comparison result. In a modification, status variables are mapped to the commands. A command is selected according to the status variables of entries to which a reported state corresponds. A success value is determined based on a result of execution of the command. The status variable of the selected command is updated with the determined success value.

30 Claims, 14 Drawing Sheets

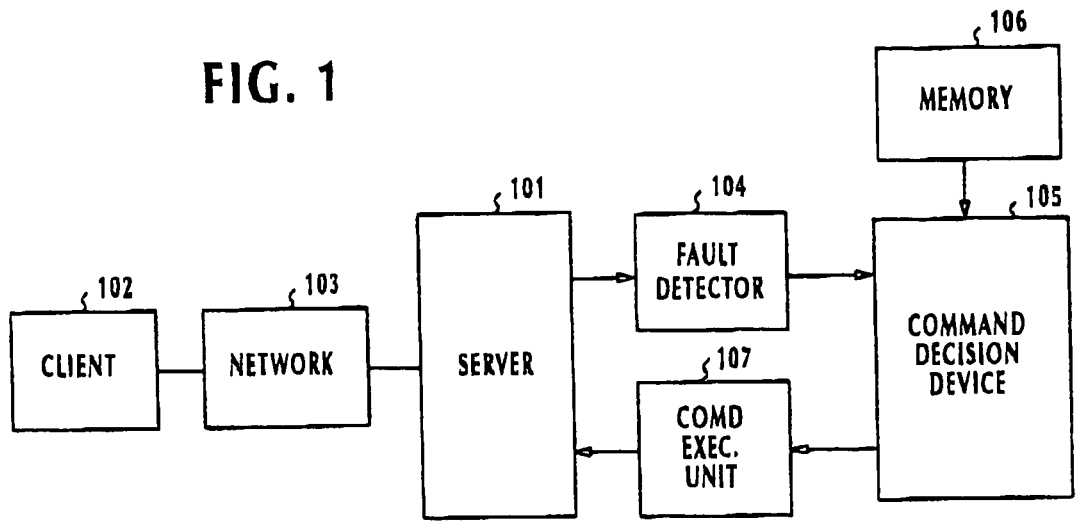

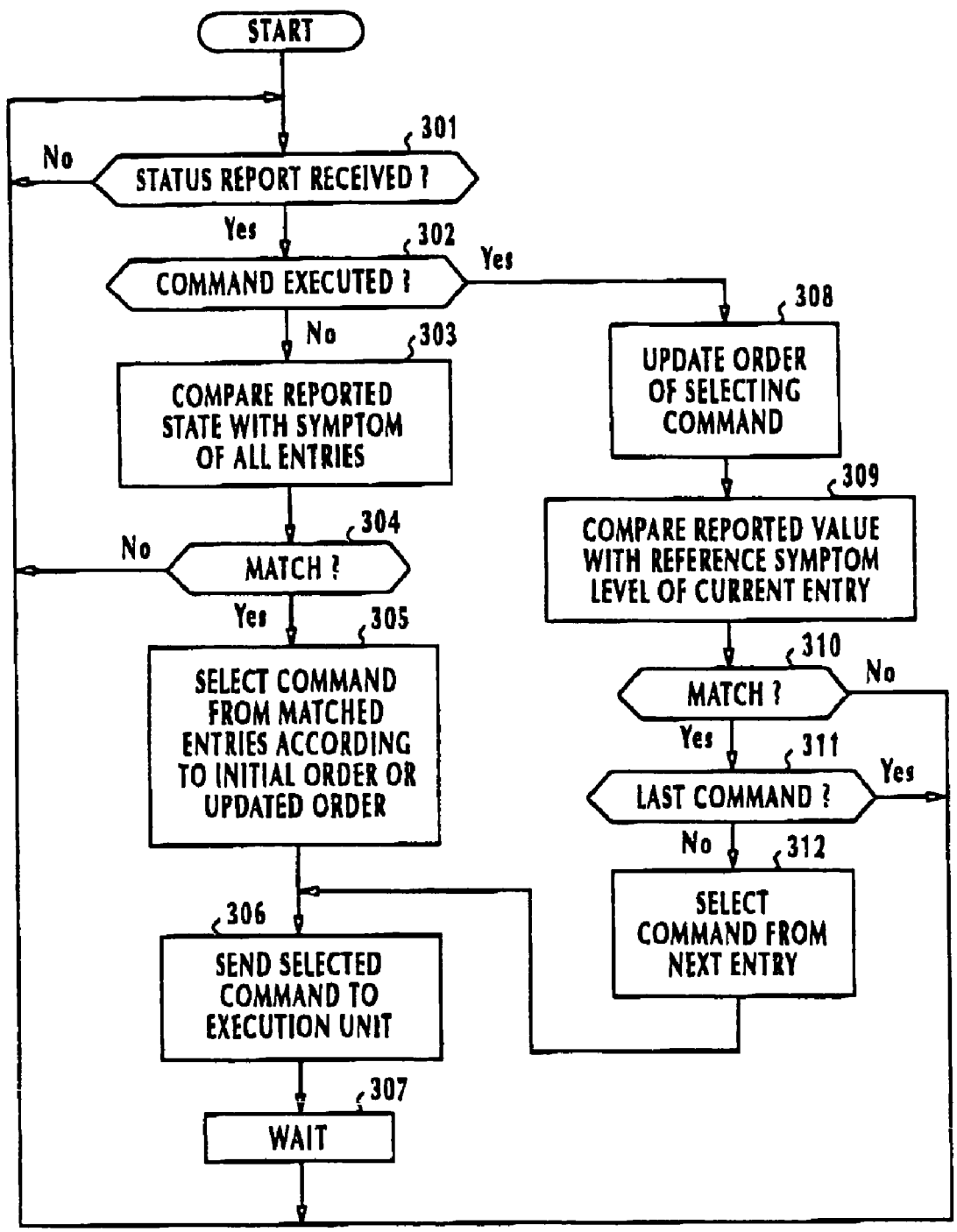

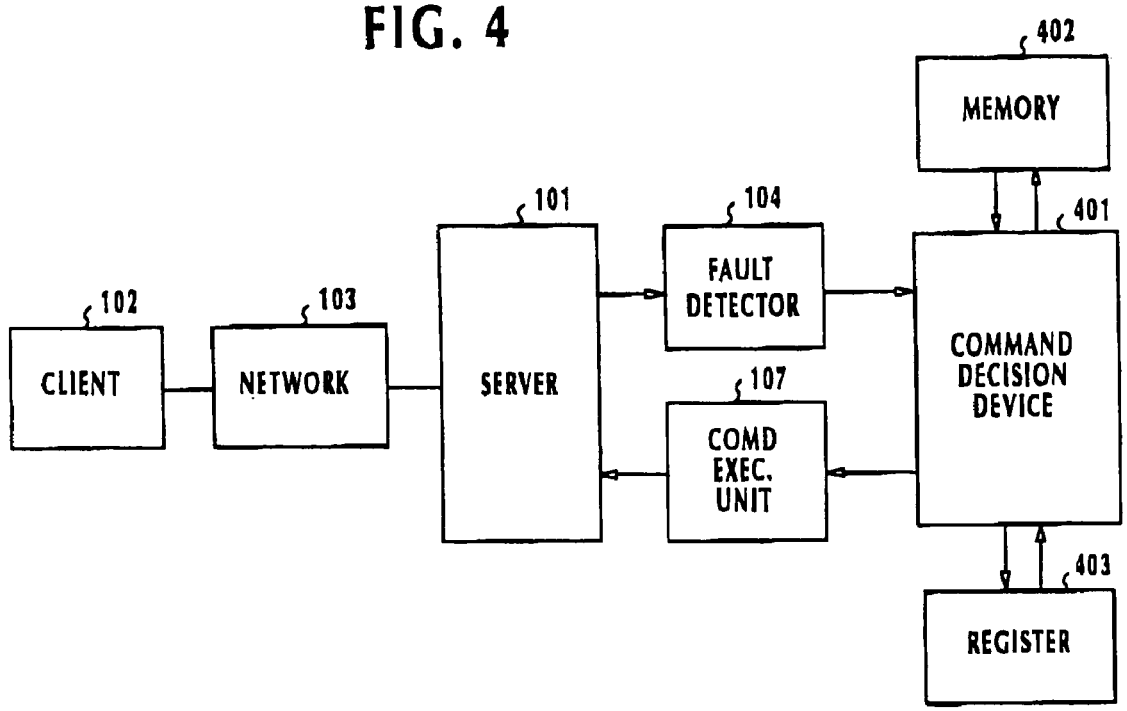

| "i" | SYMPTOM (LOCATION AND/OR DEGREE) | COMMAND | INITIAL PRIORITY LEVEL | RESULT | MODIFIED PRIORITY LEVEL |
|---|---|---|---|---|---|
| 1 | REMAINING MEMORY < 20% | REBOOT APPLICATION | 80 | -10 | 70 |
| 2 | REMAINING MEMORY < 20% | REBOOT OS | 50 | +10 | 60 |
| 3 | ABNORMAL AP OUTPUT | REBOOT APPLICATION | 80 | 0 | 80 |
| 4 | ABNORMAL AP OUTPUT | REBOOT OS | 40 | 0 | 40 |
| 5 | ABNORMAL AP OUTPUT | CHANGE DISKS | 30 | 0 | 30 |
| ⋮ | ⋮ | ⋮ | ⋮ | ⋮ | ⋮ |

⇩

402-2

| "i" | SYMPTOM (LOCATION AND/OR DEGREE) | COMMAND | INITIAL PRIORITY LEVEL | RESULT | MODIFIED PRIORITY LEVEL |
|---|---|---|---|---|---|
| 1 | REMAINING MEMORY < 20% | REBOOT APPLICATION | 80 | -20 | 60 |
| 2 | REMAINING MEMORY < 20% | REBOOT OS | 50 | 0 | 50 |
| 3 | ABNORMAL AP OUTPUT | REBOOT APPLICATION | 80 | 0 | 80 |
| 4 | ABNORMAL AP OUTPUT | REBOOT OS | 40 | 0 | 40 |
| 5 | ABNORMAL AP OUTPUT | CHANGE DISKS | 30 | 0 | 30 |
| ⋮ | ⋮ | ⋮ | ⋮ | ⋮ | ⋮ |

⇩

402-3

| "i" | SYMPTOM (LOCATION AND/OR DEGREE) | COMMAND | INITIAL PRIORITY LEVEL | RESULT | MODIFIED PRIORITY LEVEL |
|---|---|---|---|---|---|
| 1 | REMAINING MEMORY < 20% | REBOOT APPLICATION | 80 | -30 | 50 |
| 2 | REMAINING MEMORY < 20% | REBOOT OS | 50 | +10 | 60 |
| 3 | ABNORMAL AP OUTPUT | REBOOT APPLICATION | 80 | 0 | 80 |
| 4 | ABNORMAL AP OUTPUT | REBOOT OS | 40 | 0 | 40 |
| 5 | ABNORMAL AP OUTPUT | CHANGE DISKS | 30 | 0 | 30 |
| ⋮ | ⋮ | ⋮ | ⋮ | ⋮ | ⋮ |

| "i" | SYMPTOM (LOCATION AND/OR DEGREE) | COMMAND | INITIAL PRIORITY LEVEL | RESULT | MODIFIED PRIORITY LEVEL |
|---|---|---|---|---|---|
| 1 | REMAINING MEMORY < 20% | REBOOT APPLICATION | 80 | -30 | 50 |
| 2 | REMAINING MEMORY < 20% | REBOOT OS | 50 | +10 | 60 |
| 3 | ABNORMAL AP OUTPUT | REBOOT APPLICATION | 80 | -10 | 70 |
| 4 | ABNORMAL AP OUTPUT | REBOOT OS | 40 | -10 | 30 |
| 5 | ABNORMAL AP OUTPUT | CHANGE DISKS | 30 | +10 | 40 |
| ⋮ | ⋮ | ⋮ | ⋮ | ⋮ | ⋮ |

⇩

402-5

| "i" | SYMPTOM (LOCATION AND/OR DEGREE) | COMMAND | INITIAL PRIORITY LEVEL | RESULT | MODIFIED PRIORITY LEVEL |
|---|---|---|---|---|---|
| 1 | REMAINING MEMORY < 20% | REBOOT APPLICATION | 80 | -30 | 50 |
| 2 | REMAINING MEMORY < 20% | REBOOT OS | 50 | +10 | 60 |
| 3 | ABNORMAL AP OUTPUT | REBOOT APPLICATION | 80 | -20 | 60 |
| 4 | ABNORMAL AP OUTPUT | REBOOT OS | 40 | -10 | 30 |
| 5 | ABNORMAL AP OUTPUT | CHANGE DISKS | 30 | +20 | 50 |
| ⋮ | ⋮ | ⋮ | ⋮ | ⋮ | ⋮ |

⇩

402-6

| "i" | SYMPTOM (LOCATION AND/OR DEGREE) | COMMAND | INITIAL PRIORITY LEVEL | RESULT | MODIFIED PRIORITY LEVEL |
|---|---|---|---|---|---|
| 1 | REMAINING MEMORY < 20% | REBOOT APPLICATION | 80 | -30 | 50 |
| 2 | REMAINING MEMORY < 20% | REBOOT OS | 50 | +10 | 60 |
| 3 | ABNORMAL AP OUTPUT | REBOOT APPLICATION | 80 | -30 | 50 |
| 4 | ABNORMAL AP OUTPUT | REBOOT OS | 40 | -10 | 30 |
| 5 | ABNORMAL AP OUTPUT | CHANGE DISKS | 30 | +30 | 60 |
| ⋮ | ⋮ | ⋮ | ⋮ | ⋮ | ⋮ |

| "i" | SYMPTOM (LOCATION AND/OR DEGREE) | COMMAND | INITIAL PRIORITY LEVEL | RESULT | MODIFIED PRIORITY LEVEL |
|---|---|---|---|---|---|
| 1 | REMAINING MEMORY < 20% | REBOOT APPLICATION | 80 | -30 | 50 |
| 2 | REMAINING MEMORY < 20% | REBOOT OS | 50 | +10 | 60 |
| 3 | ABNORMAL AP OUTPUT | REBOOT APPLICATION | 80 | -30 | 50 |
| 4 | ABNORMAL AP OUTPUT | REBOOT OS | 40 | -10 | 30 |
| 5 | ABNORMAL AP OUTPUT | CHANGE DISKS | 30 | +40 | 70 |
| ⋮ | ⋮ | ⋮ | ⋮ | ⋮ | ⋮ |

⇩

402-8

| "i" | SYMPTOM (LOCATION AND/OR DEGREE) | COMMAND | INITIAL PRIORITY LEVEL | RESULT | MODIFIED PRIORITY LEVEL |
|---|---|---|---|---|---|
| 1 | REMAINING MEMORY < 20% | REBOOT APPLICATION | 80 | -30 | 50 |
| 2 | REMAINING MEMORY < 20% | REBOOT OS | 50 | +10 | 60 |
| 3 | ABNORMAL AP OUTPUT | REBOOT APPLICATION | 80 | -30 | 50 |
| 4 | ABNORMAL AP OUTPUT | REBOOT OS | 40 | -10 | 30 |
| 5 | ABNORMAL AP OUTPUT | CHANGE DISKS | 30 | +30 | 60 |
| ⋮ | ⋮ | ⋮ | ⋮ | ⋮ | ⋮ |

⇩

402-9

| "i" | SYMPTOM (LOCATION AND/OR DEGREE) | COMMAND | INITIAL PRIORITY LEVEL | RESULT | MODIFIED PRIORITY LEVEL |
|---|---|---|---|---|---|
| 1 | REMAINING MEMORY < 20% | REBOOT APPLICATION | 80 | -30 | 50 |
| 2 | REMAINING MEMORY < 20% | REBOOT OS | 50 | +20 | 70 |
| 3 | ABNORMAL AP OUTPUT | REBOOT APPLICATION | 80 | -30 | 50 |
| 4 | ABNORMAL AP OUTPUT | REBOOT OS | 40 | -10 | 30 |
| 5 | ABNORMAL AP OUTPUT | CHANGE DISKS | 30 | +30 | 60 |
| ⋮ | ⋮ | ⋮ | ⋮ | ⋮ | ⋮ |

| "i" | SYMPTOM (LOCATION AND/OR DEGREE) | COMMAND | INITIAL PRIORITY LEVEL | RESULT | MODIFIED PRIORITY LEVEL |
|---|---|---|---|---|---|
| 1 | REMAINING MEMORY < 20% | REBOOT APPLICATION | 80 | -30 | 50 |
| 2 | REMAINING MEMORY < 20% | REBOOT OS | 50 | +10 | (60) |
| 3 | ABNORMAL AP OUTPUT | REBOOT APPLICATION | 80 | -30 | 50 |
| 4 | ABNORMAL AP OUTPUT | REBOOT OS | 40 | -10 | 30 |
| 5 | ABNORMAL AP OUTPUT | CHANGE DISKS | 30 | +40 | 70 |
| ⋮ | ⋮ | ⋮ | ⋮ | ⋮ | ⋮ |

⇩

402-11

| "i" | SYMPTOM (LOCATION AND/OR DEGREE) | COMMAND | INITIAL PRIORITY LEVEL | RESULT | MODIFIED PRIORITY LEVEL |
|---|---|---|---|---|---|
| 1 | REMAINING MEMORY < 20% | REBOOT APPLICATION | 80 | -30 | 50 |
| 2 | REMAINING MEMORY < 20% | REBOOT OS | 50 | +20 | (70) |
| 3 | ABNORMAL AP OUTPUT | REBOOT APPLICATION | 80 | -30 | 50 |
| 4 | ABNORMAL AP OUTPUT | REBOOT OS | 40 | 0 | (40) |
| 5 | ABNORMAL AP OUTPUT | CHANGE DISKS | 30 | +30 | 60 |
| ⋮ | ⋮ | ⋮ | ⋮ | ⋮ | ⋮ |

402-12

| "i" | SYMPTOM (LOCATION AND/OR DEGREE) | COMMAND | INITIAL PRIORITY LEVEL | RESULT | MODIFIED PRIORITY LEVEL |
|---|---|---|---|---|---|
| 1 | REMAINING MEMORY < 20% | REBOOT APPLICATION | 80 | -30 | 50 |
| 2 | REMAINING MEMORY < 20% | REBOOT OS | 50 | +20 | (70) |
| 3 | ABNORMAL AP OUTPUT | REBOOT APPLICATION | 80 | -30 | 50 |
| 4 | ABNORMAL AP OUTPUT | REBOOT OS | 40 | -20 | (20) |
| 5 | ABNORMAL AP OUTPUT | CHANGE DISKS | 30 | +30 | 60 |
| ⋮ | ⋮ | ⋮ | ⋮ | ⋮ | ⋮ |

| "i" | SYMPTOM (LOCATION AND DEGREE) | COMMAND | BEFORE | AFTER | SUCCESS VALUE |
|---|---|---|---|---|---|
| 1 | REMAINING MEMORY < 20% | REBOOT APPLICATION | | | 0 |
| 2 | REMAINING MEMORY < 20% | REBOOT OS | | | 0 |
| 3 | CPU USAGE > 50% | REBOOT APPLICATION | | | 0 |
| 4 | CPU USAGE > 50% | REBOOT OS | | | 0 |
| 5 | CPU USAGE > 50% | ADD MACHINE | | | 0 |
| ⋮ | ⋮ | ⋮ | ⋮ | ⋮ | ⋮ |
| | | | | | |

| "i" | SYMPTOM (LOCATION AND DEGREE) | COMMAND | BEFORE | AFTER | SUCCESS VALUE |
|---|---|---|---|---|---|
| 1 | REMAINING MEMORY < 20% | REBOOT APPLICATION | 18 | 25 | 0 → 7 |
| 2 | REMAINING MEMORY < 20% | REBOOT OS | | | 0 |
| 3 | CPU USAGE > 50% | REBOOT APPLICATION | | | 0 |
| 4 | CPU USAGE > 50% | REBOOT OS | | | 0 |
| 5 | CPU USAGE > 50% | ADD MACHINE | | | 0 |
| ⋮ | ⋮ | ⋮ | | | ⋮ |

⇩

402-22

| "i" | SYMPTOM (LOCATION AND DEGREE) | COMMAND | BEFORE | AFTER | SUCCESS VALUE |
|---|---|---|---|---|---|
| 1 | REMAINING MEMORY < 20% | REBOOT APPLICATION | 18 → 15 | 25 → 21 | 7 → 6 |
| 2 | REMAINING MEMORY < 20% | REBOOT OS | | | 0 |
| 3 | CPU USAGE > 50% | REBOOT APPLICATION | | | 0 |
| 4 | CPU USAGE > 50% | REBOOT OS | | | 0 |
| 5 | CPU USAGE > 50% | ADD MACHINE | | | 0 |
| ⋮ | ⋮ | ⋮ | | | ⋮ |

⇩

402-23

| "i" | SYMPTOM (LOCATION AND DEGREE) | COMMAND | BEFORE | AFTER | SUCCESS VALUE |
|---|---|---|---|---|---|
| 1 | REMAINING MEMORY < 20% | REBOOT APPLICATION | 15 | 21 | 6 |
| 2 | REMAINING MEMORY < 20% | REBOOT OS | 12 | 50 | 38 |
| 3 | CPU USAGE > 50% | REBOOT APPLICATION | | | 0 |
| 4 | CPU USAGE > 50% | REBOOT OS | | | 0 |
| 5 | CPU USAGE > 50% | ADD MACHINE | | | 0 |
| ⋮ | ⋮ | ⋮ | | | ⋮ |

| "i" | SYMPTOM (LOCATION AND DEGREE) | COMMAND | PRIORITY LEVELS | BEFORE | AFTER | SUCCESS VALUE |
|---|---|---|---|---|---|---|
| 1 | REMAINING MEMORY < 20% | REBOOT AP | 80 | | | 8 |
| 2 | REMAINING MEMORY < 20% | REBOOT OS | 50 | | | 40 |
| 3 | CPU USAGE > 50% | REBOOT AP | 80 | | | 0 |
| 4 | CPU USAGE > 50% | REBOOT OS | 50 | | | 0 |
| 5 | CPU USAGE > 50% | ADD MACHINE | 30 | | | 0 |
| ⋮ | ⋮ | ⋮ | ⋮ | ⋮ | ⋮ | ⋮ |
| | | | | | | |

FAULT RECOVERY SYSTEM AND METHOD FOR ADAPTIVELY UPDATING ORDER OF COMMAND EXECUTIONS ACCORDING TO PAST RESULTS

BACKGROUND OF THE INVENTION

1. Field of the Invention

The present invention relates generally to data processors which provide business information services such as Web and internet sales services, and more specifically to a fault recovery system and method for restoring a data processor from failure by issuing a fault restoration command to the data processor according to the type of trouble.

2. Description of the Related Art

Proliferation of business information services using a communications network has been accelerated due to their inherent advantages of speed and efficiency with the combined ability to meet individual needs of clients. With the rapidly increasing range of applications, computers that provide information services to many users must be fault-tolerant and the issue of fault tolerance is becoming increasingly important.

In fault recovery systems generally known in the data processing art, the operating state of a server is constantly monitored and compared with a predetermined set of symptoms. When the detected operating state corresponds to one of the predetermined symptoms, it is determined that the server has failed and a corresponding fault restoration command is automatically executed on the server, so that the server is completely restored from failure or prevented from becoming faulty. However, the executed fault restoration command is also one of the commands that are predetermined and cannot adaptively be altered. Since the operating performance of servers vary with time and individual configurations, the prior art fault recovery system cannot adapt to the varying condition of the server. Although this problem could be solved manually, the maintenance cost would be substantial due to the needs for frequent alterations of reference settings and corresponding fault restoration commands.

Japanese Patent Publication 1995-54474-B2 discloses a fault recovery system in which a set of different fault restoration commands is provided for each detected operating condition of a server. In this system, the commands of each set are sequentially executed according to a predetermined order of priority. Although the execution of different commands may be effective for solving some type of troubles, the order of command executions is unalterably fixed and hence the commands executed in the early stage of restoration are not necessarily optimal for a particular problem. It is likely that a repeated cycle of futile command executions can occur with a result that a long time is taken to restore the server from failure. Additionally, the repeated futile command executions could possibly trigger other troubles. Therefore, limitations would be imposed on the use of some commands that are likely to trigger other troubles or their priority would be manually altered to map the commands to specific service configurations. This would result in a narrow range of usable commands and the maintenance cost of the server will grow in proportion to the increasing complexity of the system.

Japanese Patent Publication 2002-251295-A discloses a fault recovery system that includes a knowledge assistance tool, which was used in the past for maintenance personnel. The assistance tool is a collection of past records and provides mapping of troubles to fault recovery commands. The fault recovery system assigns priority levels to the recovery commands and modifies the priority levels according to the degree of similarity between past operating state and currently detected state. However, since manual input is required for mapping past troubles to commands and hence the effectiveness of a command execution largely depends on the competence of an operator, it is uncertain that a command selected according to the assistance tool actually succeeds in shooting the trouble.

Therefore, there exists a need to provide a fault recovery system and method which eliminates the shortcomings of the prior art fault recovery systems.

SUMMARY OF THE INVENTION

It is therefore an object of the present invention to provide a fault recovery system and method which selects fault restoration commands optimized to different types of trouble and reduces downtime without increasing maintenance cost.

Another object of the present invention is to provide a fault recovery system and method which adaptively updates the order of command executions according to past results.

In the general terms, the present invention provides a fault recovery system comprising fault detecting means for transmitting a status report indicating an operating condition of a data processing apparatus, command execution means for executing a command in the data processing apparatus, and decision means. The decision means is responsive to a status report from the fault detecting means for selecting one of a plurality of fault restoration commands according to an operating condition indicated in the status report and according to a command selection order, and transmitting the selected command to the command execution means. The decision means is further responsive to a subsequent status report from the fault detecting means, for evaluating the result of execution of the transmitted command according to an operating condition indicated in the subsequent status report, and updating the command selection order according to the evaluated result.

According to a first aspect of the present invention, there is provided a fault recovery system comprising fault detecting means for transmitting a status report indicating an operating condition of a data processing apparatus, command execution means for executing a command in the data processing apparatus, a store for defining a plurality of entries and mapping in each of the entries one of a plurality of reference fault conditions of the data processing apparatus to one of a plurality of fault restoration commands and one of a plurality of priority levels and decision means. The decision means is responsive to a status report from the fault detecting means for detecting one of the reference fault conditions which corresponds to a fault condition indicated in the status report, selecting one of the fault restoration commands according to the priority levels of the entries which correspond to the detected reference fault condition, transmitting the selected command to the command execution means, and estimating a result of the execution of the transmitted command. The decision means is further responsive to a subsequent status report from the fault detecting means for making a comparison between the estimated result and a fault condition indicated in the subsequent status report and updating the priority levels according to a result of the comparison.

According to a second aspect of the present invention, there is provided a fault recovery system comprising fault detecting means for transmitting a status report indicating a value of an operating condition of a data processing apparatus, command execution means for executing a command in the data processing apparatus, a store for defining a plurality of entries and mapping in each of the entries one of a plurality of reference values of operating conditions of the data processing apparatus to one of a plurality of fault restoration commands and one of a plurality of status variables, and decision means. The decision means is responsive to a first status report from the fault detecting means, for detecting one of the reference values which corresponds to a value indicated in the status report, making an estimation of success or failure of command execution by calculating a sum of a status variable mapped to the detected reference value and the value of the first status report and comparing the sum with the detected reference value to produce an estimated value, selecting a fault restoration command from the entries in which the detected reference value is contained according to the estimated value, and transmitting the selected command to the command execution means. The decision means is further responsive to a second, subsequent status report from the fault detecting means for subtracting the value of the first status report from a value indicated in the second status report to produce a success value, and updating the calculated status variable with the success value.

According to a third aspect of the present invention, there is provided a fault recovery system comprising fault detecting means for transmitting a status report indicating a value of an operating condition of a data processing apparatus, command execution means for executing a command in the data processing apparatus, a store for defining a plurality of entries and mapping in each of the entries one of a plurality of reference values of operating conditions of the data processing apparatus to one of a plurality of fault restoration commands, one of a plurality of priority levels, and one of a plurality of status variables, and decision means. The decision means is responsive to a first status report from the fault detecting means, for detecting one of the reference values which corresponds to a value indicated in the status report, making an estimation of success or failure of command execution by calculating a sum of a status variable mapped to the detected reference value and the value of the first status report and comparing the sum with the detected reference value to produce an estimated value, selecting a fault restoration command from the entries in which the detected reference value is contained according to the estimated value and the priority levels of the entries, and transmitting the selected command to the command execution means. The decision means is further responsive to a second, subsequent status report from the fault detecting means for subtracting the value of the first status report from a value indicated in the second status report to produce a success value, and updating the calculated status variable with the success value.

According to a fourth aspect of the present invention, there is provided a fault recovery system comprising fault detecting means for transmitting a status report indicating a value of an operating condition of a data processing apparatus, command execution means for executing a command in the data processing apparatus, a store for defining a plurality of entries and mapping in each of the entries one of a plurality of reference values of operating conditions of the data processing apparatus to one of a plurality of fault restoration commands, one of a plurality of priority levels, and one of a plurality of status variables, and decision means. The decision means is responsive to a first status report from the fault detecting means, for detecting one of the reference values which corresponds to a value indicated in the status report, making an estimation of success or failure of command execution by calculating a sum of a status variable mapped to the detected reference value and the value of the first status report and comparing the sum with the detected reference value to produce an estimated value, selecting a fault restoration command from the entries in which the detected reference value is contained according to the estimated value and the priority levels of the entries, and transmitting the selected command to the command execution means. The decision means is further responsive to a second, subsequent status report from the fault detecting means for subtracting the value of the first status report from a value indicated in the second status report to produce a success value, and updating the calculated status variable with the success value.

According to a fifth aspect of the present invention, there is provided a fault recovery method for a data processing apparatus to which fault detecting means is connected for transmitting a status report indicating an operating condition of the data processing apparatus and to which command execution means is further connected for executing a command in the data processing apparatus, the method comprising the steps of: (a) responsive to a status report from the fault detecting means, selecting one of a plurality of fault restoration commands according to an operating condition indicated in the status report and according to a command selection order, (b) transmitting the selected command to the command execution means, and (c) responsive to a subsequent status report from the fault detecting means, evaluating the result of execution of the transmitted command according to an operating condition indicated in the subsequent status report, and updating the command selection order according to the evaluated result.

According to a sixth aspect of the present invention, there is provided fault recovery method for a data processing apparatus to which fault detecting means is connected for transmitting a status report indicating an operating condition of the data processing apparatus and to which a command execution means is further connected for executing a command in the data processing apparatus, the method comprising the steps of (a) defining a plurality of entries and mapping in each of the entries one of a plurality of reference fault conditions of the data processing apparatus to one of a plurality of fault restoration commands and one of a plurality of priority levels, (b) responsive to a status report from the fault detecting means, detecting one of the reference fault conditions which corresponds to a fault condition indicated in the status report, (c) selecting one of the fault restoration commands according to the priority levels of the entries which correspond to the detected reference fault condition and transmitting the selected command to the command execution means, (d) estimating a result of the execution of the transmitted command, and (e) responsive to a subsequent status report from the fault detecting means for making a comparison between the estimated result and a fault condition indicated in the subsequent status report and updating the priority levels according to a result of the comparison.

According to a seventh aspect of the present invention, there is provided a fault recovery method for a data processing apparatus to which fault detecting means is connected for transmitting a status report indicating an operating condition of the data processing apparatus and to which a command execution means is further connected for executing a command in the data processing apparatus, the method comprising the steps of: (a) defining a plurality of entries and mapping in each of the entries one of a plurality of reference values of operating conditions of the data processing apparatus to one of a plurality of fault restoration commands and one of a plurality of status variables, (b) responsive to a first status report from the fault detecting means, detecting one of the reference values which corresponds to a value indicated in the status report, (c) making an estimation of success or failure of command execution by calculating a sum of a status variable mapped to the detected reference value and the value of the first status report and comparing the sum with the detected reference value to produce an estimated value, (d) selecting a fault restoration command from the entries in which the detected reference value is contained according to the estimated value, and transmitting the selected command to the command execution means, and (e) responsive to a second, subsequent status report from the fault detecting means for subtracting the value of the first status report from a value indicated in the second status report to produce a success value and updating the calculated status variable with the success value.

According to an eighth aspect of the present invention, there is provided a fault recovery method for a data processing apparatus to which fault detecting means is connected for transmitting a status report indicating an operating condition of the data processing apparatus and to which a command execution means is further connected for executing a command in the data processing apparatus, the method comprising the steps of: (a) defining a plurality of entries and mapping in each of the entries one of a plurality of reference values of operating conditions of the data processing apparatus to one of a plurality of fault restoration commands, ore of a plurality of priority levels, and one of a plurality of status variables, (b) responsive to a first status report from the fault detecting means, detecting one of the reference values which corresponds to a value indicated in the status report, (c) making an estimation of success or failure of command execution by calculating a sum of a status variable mapped to the detected reference value and the value of the first status report and comparing the sum with the detected reference value to produce an estimated value, (d) selecting a fault restoration command from the entries in which the detected reference value is contained according to the estimated value and the priority levels of the entries and transmitting the selected command to the command execution means, and (e) responsive to a second, subsequent status report from the fault detecting means, subtracting the value of the first status report from a value indicated in the second status report to produce a success value, and updating the calculated status variable with the success value.

BRIEF DESCRIPTION OF THE DRAWINGS

The present invention will be described in detail further with reference to the following drawings, in which:

FIG. 1 is a block diagram of a fault recovery system of a server (data processing apparatus) providing communication service to a client terminal according to the present invention;

FIG. 2 is an illustration of mapped symptom command relationships arranged in the memory of FIG. 1 according to the priority levels of a first embodiment of the present invention;

FIG. 3 is a flowchart of the operation of the fault recovery controller of RIG. 1 according to the present invention;

FIG. 4 is a block diagram of a first embodiment of the present invention;

FIGS. 6A and 6B are illustrations of the contents of the memory of FIG. 4 in the form of tables for indicating a process in which the memory is updated according to results of the execution of commands when low memory conditions are detected in the server;

FIG. 7 is an illustration of the contents of the memory of FIG. 4 in the form of tables for indicating a process a process which is likely to occur if the memory contents are updated according to results of the execution of commands when multiple troubles (low memory and abnormal application output) are detected in the server;

FIG. 9 is an illustration of the contents of the memory of FIG. 4 in the form of tables for indicating a process in which the memory is updated according to results of the execution of a shared command when multiple troubles are detected in the server;

FIG. 10 is an illustration of the contents of the memory of FIG. 4 according to a third embodiment of the present invention;

FIG. 12 is an illustration of the contents of the memory of FIG. 4 in the form of tables for indicating a process in which the memory is updated according to success results of command executions;

FIG. 13 is an illustration of the contents of the memory of FIG. 4 according to a fourth embodiment of the invention.

GENERAL DESCRIPTION

Figure 5:
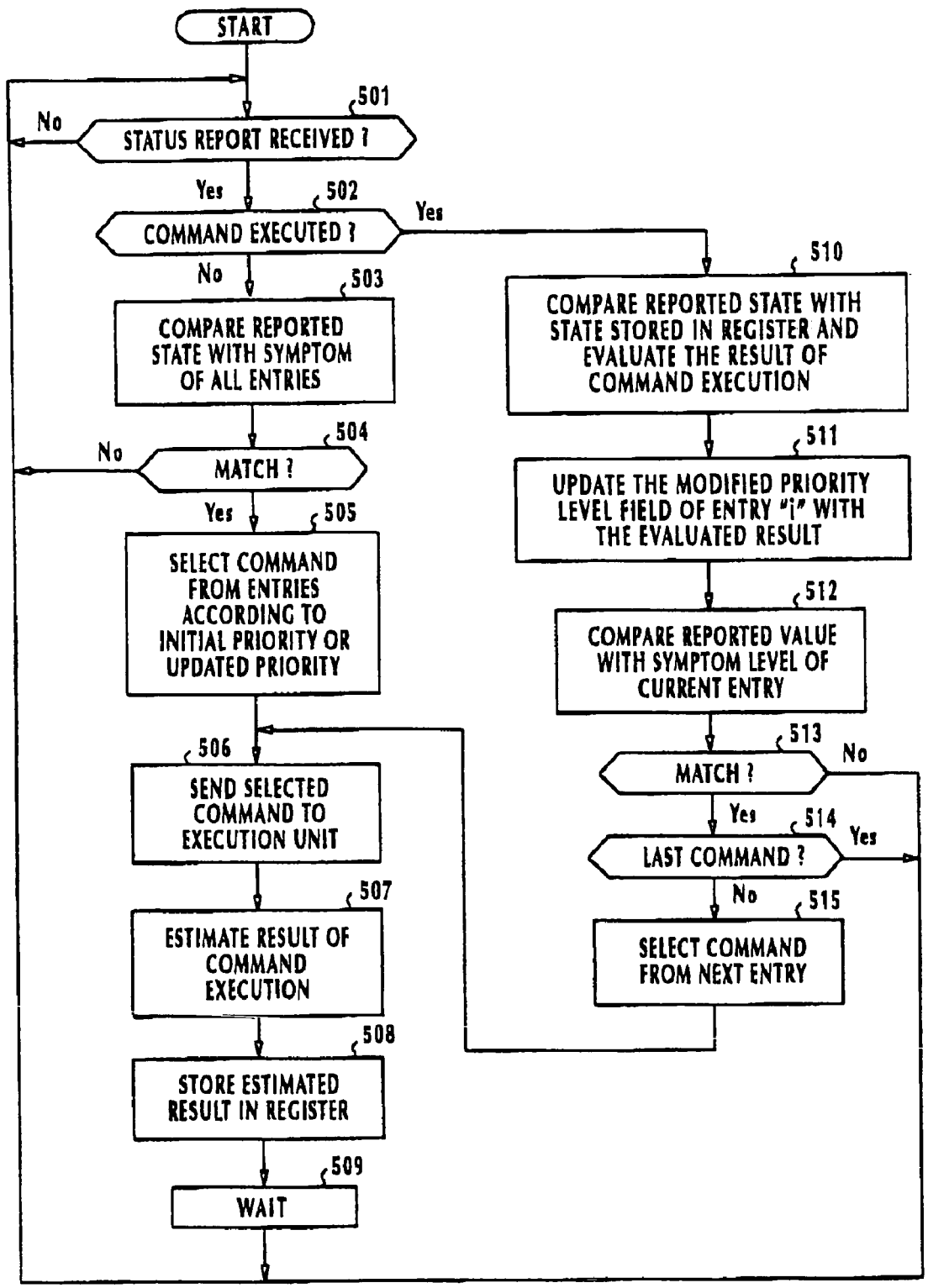
FIG. 5 is a flowchart of the operation of the fault recovery controller of FIG. 1 according to the first embodiment of the invention.

In FIG. 1, a fault recovery system of the present invention is illustrated. The system comprises a server 101 connected to a client terminal 102 via a communications network 103. A fault detector 104 is connected to the server 101 for detecting when the operation of the server is abnormal and issues a status report to a command decision device 105, indicating the current operating state of the server. A memory device 106 is connected to the command decision device 105. Command decision device 105 reads a fault restoration command from the memory in response to the status report from the fault detector 104. A command execution unit 202 is provided for receiving the command from the decision device 105 and executes the received command on the server 101.

As illustrated in FIG. 2, the memory device 106 is partitioned into a plurality of entries identified by an item number "i". Each entry is divided into a symptom field 210, a command field 202 and a priority field 203. Symptom field 201 indicates a predetermined level of symptom, and the command field 203 indicates a fault restoration command. The decimal number given in the priority field 203 of each entry indicates the level of priority assigned to that entry, i.e., the order of execution of commands for a given failure indicating symptom of the server. Higher priority is given to the command of an entry having a larger decimal number. Multiple entries of the same symptom level (or fault decision threshold or reference level) are arranged in descending order of priority. In the symptom field 201, remaining memory of the server and abnormal output of an application program are listed as an example. Different commands are mapped to the same symptom and arranged according to the order of priority.

In the entry #1, for example, the symptom field 201 indicates that a remaining amount of the main memory of server 101 is less than 20% of its full capacity. In the same entry, "Reboot Application" is mapped to the "Remaining Memory<20%" as a fault restoration command 202 and a value 80 is given in the priority field 203. In the entry #2, the symptom level 201 indicates the same "Remaining Memory<20%", but the corresponding command in the command field 202 is "Reboot Operating System" and the priority field 203 of this entry is given a value 50. In the entries #3, #4 and #5, abnormal output of application of the server is indicated. Different commands are respectively assigned to the entries #3, #4 and #5. In the entry #3, the command field 202 indicates "Reboot Application" command and the priority field 203 indicates a value 80. In the entry #4, the command field 202 specifies a "Reboot OS" command and the priority field 203 indicates a value 40, for example. In the entry #5, the command field 202 indicates "Change Disks" command and the priority field 203 indicates a value 30.

The operation of the command decision device 105 proceeds according to the flowchart of FIG. 3. The operation begins with step 301 in which the decision device 105 monitors the output of the fault detector 104 for receiving a status report. If a status report is received from the fault detector 104, the command decision device 105 proceeds to step 302 to check to see if a command has been executed for the status report. Initially, the decision is negative and flow proceeds to step 303 to compare the reported operating state of the server with the symptom of all entries for detecting a match or a mismatch.

If there is a match (step 304), flow proceeds to step 304 to step 305 for selecting a command from the matched entry according to a preset order or an updated order if the latter is available. If the updated priority is not available, the command is selected from the entry of highest priority. The selected command is sent to the command execution unit 107 at step 306. Command decision device 105 waits a sufficient amount of time at step 307 for the fault detector 104 to generate and transmit a status report, and then returns to step 301 to receive the next status report.

Since the next status report is a response to the execution of a command, the decision at step 302 is affirmative, and the command decision device 105 proceeds to step 308 to update the command selection order based on a result of comparison between the two operating conditions indicated in the previous and current status reports. Flow proceeds to step 309 to compare the reported value of the current status report with the reference symptom level of the current entry for a match or a mismatch (step 310). If the execution of the command is successful, a mismatch is detected at step 310 and flow returns to the starting point of the routine. If the execution of the command has failed, a match is detected and flow proceeds to step 311 to check to see if the executed command is the last command for the same symptom. If not, flow proceeds to step 312 to select a command from the next entry before proceeding to command transmission step 306. If the executed command is the last command, flow returns to the starting point of the routine.

If the command selection order has been updated at step 308 when a subsequent status report is received, a command is selected according to the updated order at step 305. The same process will be repeated if command execution is not successful. As a result of the repeated updating, the order of command selection is optimized to the individual characteristics of servers.

Therefore, if a status report is initially received at step 301, which indicates that the remaining memory of the server is less than 20% of its full capacity (steps 303, 304), the command decision device 105 selects the Reboot Application command from the command field 202 of the entry #1 according to the preset order (step 305) and sends it to the command execution unit 107 (step 306), and waits for the server to reboot the current application (step 307) before returning to step 301 to receive the next status report.

In response to the next status report (step 301), the command decision device 105 navigates through step 302 to step 308 to update the command selection order according to the remaining memory value indicated in the current status report relative to the remaining memory value indicated in the previous report. At step 309, the remaining memory value of the current status report is compared with the reference of less-than-20% of entry #1. If the condition of the server is improved, a mismatch is detected at step 310 and the decision device 105 recognizes that the abnormal condition has been removed by the rebooting of the application and returns to the starting point of the routine.

If the low memory condition of the server is not improved by the rebooting of the application, the decision device 105 detects a match again at step 310 and flow proceeds through step 311 to step 312 to select the Reboot OS command from the next entry #2 and sends it to the command execution unit 107 (step 306) and waits for the next status report (step 307). If the condition of the server is improved by the rebooting of the Operating System, the decision device 105 updates the command selection order according to the result of the execution of the Reboot OS command (step 308) and detects a mismatch at step 310 and returns to step 301. If the execution of the Reboot OS command has failed, flow proceeds from step 310 to step 311. Since the Reboot OS command is the last command for the low memory condition, the command decision device 105 exits step 311 and returns to step 301.

If the status report received at step 301 indicates that the output of the application is abnormal (steps 303, 304), the command decision device 105 selects the Reboot Application command from the command field 202 of the entry #3 (step 305) according to the preset order, sends the selected command to the command execution unit 107 (step 306) and waits a predetermined time (step 307) to allow the server to reboot the current application and returns to step 301 to receive the next status report. If the abnormal operation of the application is improved by the rebooting of the application, the command decision device 105 updates the selection order according to the successful result of the execution of Reboot Application command (step 308) and detects a mismatch at step 310 and returns to step 301. If the operation of the server is not improved by the rebooting of the application, the decision device 105 updates the selection order according to the failed result of execution of Reboot Application command (step 308) and detects a match again at step 310 and navigates through step 311 to step 312 to select the Reboot OS command from the next entry #4 (step 312) and sends it to the command execution unit 107 (step 306).

If the rebooting of OS is successful for the abnormal application output, the selection order is updated according to the success result of the Reboot OS command (step 308) and a mismatch is detected at step 310 and flow returns to step 301. Otherwise, a match is detected again at step 310 and flow proceeds through steps 311 to 312 to select the Change Disks command from the entry #5 (step 312) and transmit the command to the execution unit (step 306). If the execution of the change Disks command is successful, a mismatch will be detected at step 310 and flow returns to step 301. If the execution of the Change Disk command fails, a match is detected again at step 310. Since the Change Disk command is the last command for the current symptom, the command decision device returns from step 311 to the starting point of the routine.

DESCRIPTION OF PREFERRED EMBODIMENTS

A first embodiment of the present invention is shown in FIG. 4, which differs from the previous discussion in that a status register 403 is additionally provided and the command decision device 401 performs read/write operation on both of the memory 402 and the status register 403.

The operation of the command decision device 401 proceeds according to the flowchart of FIG. 5.

When the command decision device 401 receives a status report from the fault detector 104 at step 501, it proceeds to step 502 to check to see if a command has been executed for the status report. Since the decision at step 502 is negative when the status report is the first to arrive in a series of reports, flow proceeds to step 503 to compare the reported state with the symptom of all entries of the memory 402 for detecting a match or a mismatch (step 504).

As shown in FIG. 6A, each entry of the memory 402 includes a result field 601 and a modified priority field 602. If there is a corresponding symptom in one of the entries, the decision at step 504 is affirmative and flow proceeds to step 505 to select a command from the matched entry (i) of highest priority or according to an updated priority level if specified in the modified priority field of the entry, and sends the selected command to the command execution unit (step 506).

At step 507, the command decision device 401 makes an estimate of the result of execution of the transmitted command. For example, if the remaining memory of the server is less than 20% and the Reboot Application command is selected, the command decision device 401 estimates an operating condition of the server which may result from the execution of the Reboot Application command. At step 508, the estimated state of the server is stored in the register 403. Since higher than 20% can be expected as a result of the execution of the Reboot Application command, a "higher than 20%" value is set in the register 403 as an estimate of the selected command at step 508. Following a wait interval (step 509), the command decision device 401 returns to step 501.

When a subsequent status report is received (step 501), the command decision device 401 makes an affirmative decision at step 502 and proceeds to step 510 to compare the operating state value indicated in the received status report with the estimated state value stored in the status register 403, evaluates the result of the comparison and sets the evaluated result value in the result field 601 of the current entry (i). At step 511, the command decision device 401 updates the priority level field 602 of the executed entry (i) with the evaluated result value and compares the reported value with the symptom (reference) level of the current entry (step 512) for detecting a match or a mismatch (step 513). If a mismatch is detected (step 513), it is determined that the status report indicates that the abnormal condition has been eliminated and flow returns to step 501. If a match is detected again, the command decision device 401 recognizes that the faulty condition still prevails. If the command of entry (i) is not the last command (step 514), flow proceeds to step 515 to select a command from the next entry (i+1) and proceeds to step 506 for transmission of the selected command to the command execution unit 107. If the decision at step 514 is affirmative, flow returns to step 501.

As the routine is repeatedly executed in this manner, the command decision device 401 successively updates the memory 402 by rewriting the result field 601 and the modified priority field 602 of the entries of the same symptom with results of previous commands.

If the modified priority level field of each entry has been updated when a status report is subsequently received from the fault detector, the command decision device 401 selects a command from an entry whose priority is highest in the modified priority level fields of matched entries (step 505).

The following is a description of an exemplary process with reference to FIGS. 6A and 6B in which the contents of the memory 402 are modified according to the result of the execution of commands in response to a series of individual status reports. The contents of the memory 402 are illustrated in the form of tables 402-1, 402-2 and 402-3 (FIG. 6A) as the memory is updated in succession in response to low memory status reports, and then in the form of tables 402-4, 402-5 and 402-6 (FIG. 6B) as the memory is updated in response to status reports indicating an abnormal application output. In the following examples, it is assumed that the command decision device 401 increases the priority level of a command by 10 in response to a success of the execution of the command and decreases it by 10 in response to a failure of the execution of the command.

The description of table 402-1 is based on the assumption that in response to a low memory status report the Reboot Application command of entry #1 is first executed since its priority is initially higher than that of Reboot OS command of entry #2, but the execution results in a failure. The Reboot OS command of entry #1 is subsequently executed with a successful result. In this example, the command decision device 401 determines, at step 510, that the result of the execution of Reboot Application command of entry #1 indicates that the low remaining memory state still prevails and lowers the priority of entry #1 from the initial value 80 to a new value 70 at step 511. Since the modified priority level of entry #1 does not affect the order of priority of entries #1 and #2, a command is selected from the next entry. As a result, the Reboot OS command is executed. If the execution of the Reboot OS command results in a status report indicating that the remaining memory is higher than 20%, the command decision device 401 increases the priority level of entry #2 from 50 to 60.

With the priority levels of memory 402 being updated as indicated in the table 402-1, a low memory state can occur again and a second low memory status report issues. The description now shifts from table 402-1 to table 402-2. The description of table 402-2 is based on the assumption that in response to the second low memory status report the Reboot Application command of entry #1 and the Reboot OS command of entry #2 are successively executed, but the execution of both commands fails. In this example, the Reboot Application command of entry #1 is executed first since its priority is still higher than the priority of entry #2. When the execution of the Reboot Application command fails, the priority value of entry #1 is further decreased that it changes from the current value 70 to a new value 60, as indicated in table 402-2. When the subsequent execution of the Reboot OS command of entry #2 fails, the priority value of this entry is decreased from the current value 60 to a new value 50.

With the priority levels of memory 402 being updated as indicated in the table 402-2, a low memory state can still occur again, resulting in a third low memory status report. The description now shifts from table 402-2 to the table 402-3. In response to the third low memory status report, the Reboot Application command of entry #1 and the Reboot OS command of entry #2 are successively executed in this order since the table 402-2 shows that the order of priority still remains unchanged for entries #1 and #2 although their priority levels have been modified previously. The description of table 402-3 is based on the assumption that the execution of the Reboot Application command fails, and the execution of the Reboot OS command succeeds. When the execution of the Reboot Application command fails, the priority value of entry #1 is further decreased so that it changes from the current value 60 to a new value 50. When the subsequent execution of the Reboot OS command of entry #2 succeeds, the priority value of this entry is increased from the current value 50 to a new value 60. It is seen that the priority levels of entries #1 and #2 are reversed, thus giving higher priority to the Reboot OS command. If a low memory status report is subsequently received, the Reboot OS command will be executed in precedence over the Reboot Application command.

Following the updating of memory 402 in the form of table 402-3, assume that the command decision device 401 subsequently receives a status report indicating an abnormal application output. The description now concerns the table 402-4 (FIG. 6B).

The description of table 402-4 is based on the assumption that in response to a first abnormal application output status report the Reboot Application command of entry #3 and the Reboot OS command of entry #4 are successively executed in this order according to their initial priority levels, but the execution of both commands results in a failure. As a result, the priority levels of entries #3 and #4 are lowered from their initial values 80 and 40 to modified values 70 and 30, respectively. The Change Disks command of entry #5 is then executed. If the execution of the Change Disks command is successful, the priority level of entry #5 is raised from the initial value 30 to modified value 40, thus reversing the order of priority of entries #4 and #5.

Therefore, in response to a second status report of the abnormal application output, the Reboot Application command is first executed. However, if this execution fails, the Change Disks command will be executed in precedence over the Reboot OS command. As indicated in the table 402-5, the priority level of entry #3 is lowered from 70 to 60 and the priority level of entry #5 is raised from 40 to 50.

If the command decision device 401 receives a third status report indicating the abnormal application output, it is likely that similar events can occur in sequence. Since the entry #3 is of the highest priority (see table 402-5), the Reboot Application command is first executed. If it fails, the Change Disks command of entry #5 is next executed. The priority level of entry #3 is lowered to 50 and the priority level of entry #5 is raised to 60 as indicated in the table 402-6. As a result, the entries #3 and #6 are reversed in order, placing the entry #5 to the highest level. If a status report of the same type is subsequently received, the Change Disks command will be executed in preference over the commands of the other entries.

When the priority levels of entries are updated for a particular abnormal condition of the server in a manner as discussed above, the command that is finally given the highest priority can be considered the most appropriate command for that particular abnormal condition. By placing the most appropriate command at the top of priorities, the number of failed command executions can be advantageously reduced since a futile command execution may trigger another trouble. Further, the repeated feedback command decision algorithm of this invention can be used for any type of servers because of its adaptive feature.

It is known that, if the application of a server contains a program bug, a continued operation of the server may result in a memory leak and a low memory status report issues. Hence the Reboot Application command is usually given the highest priority over other commands. However, different servers have different operating characteristics. In some servers a normally harmless bug in their Operating System may be activated under particular conditions to the extent that their operation is seriously affected. In such servers, giving the highest priority to the Reboot Application command may result in a low operating efficiency. On the other hand, there is another type of servers in which the Reboot Application command has long been the optimum command. However, they experienced a drastic change in their operating characteristic once their disks had been changed. In such instances, the operator was usually responsible for manually examining such a problem and determines whether the troubled server needs a change in the command priority levels. In the present invention, the command priority levels of this type of servers can be adaptively customized to their particular operating characteristic. The server's maintenance cost and downtime can be reduced.

Prior to the description of a second embodiment of the present invention, reference is made to FIG. 7 to describe a problem that can occur as a result of the command decision device 401 simultaneously receiving multiple status reports of different types (i.e., low memory and abnormal application output) during a short period of time, rather than individually receiving status reports of different categories.

Assume that an abnormal application output occurs immediately after the memory 402 was updated as shown in the table 402-6 and the Reboot Application command is then successfully executed, so that the priority level of entry #5 is increased to 70, a value that is highest of entries #1 to #5, as indicated in a table 402-7, FIG. 7. Under this condition, if the command decision device 401 receives multiple status reports indicating low memory and abnormal application output. Since the commands of entries #1 through #5 are available for combating the problems and the entry #5 is of the highest priority, the Change Disks command is first executed. If this execution fails, the priority level of entry #5 will be lowered to 60 as indicated in a table 402-8. Since the abnormal condition still prevails, the command decision device 401 will continue its search for the next command. The Reboot OS command of entry #2 and the Change Disks command of entry #5 are the candidates for the next command because the table 402-8 shows that both entries #2 and #5 are of the same priority level of 60. If the command of entry #2 is executed first because of its higher rank with respect to entry #5, and this execution succeeds, the priority level of entry #2 is increased to 70 as indicated in a table 402-9, placing it at the top of priorities.

In most cases, multiple troubles are detected in a server after an initial trouble has triggered other troubles. In order to restore the server from such multiple troubles, it is necessary to identify the cause of the initial trouble. The Change Disks command selected in the case of table 402-7 is characteristic to the type of troubles such as abnormal application output. Therefore, the selection of the Change Disks command is not the best selection in the case of multiple troubles and may aggravate the situation. While the Reboot OS command of entry #2 finally saved the multi-trouble situation as indicated in table 402-9, it takes a long time to solve the problem.

Figure 8:
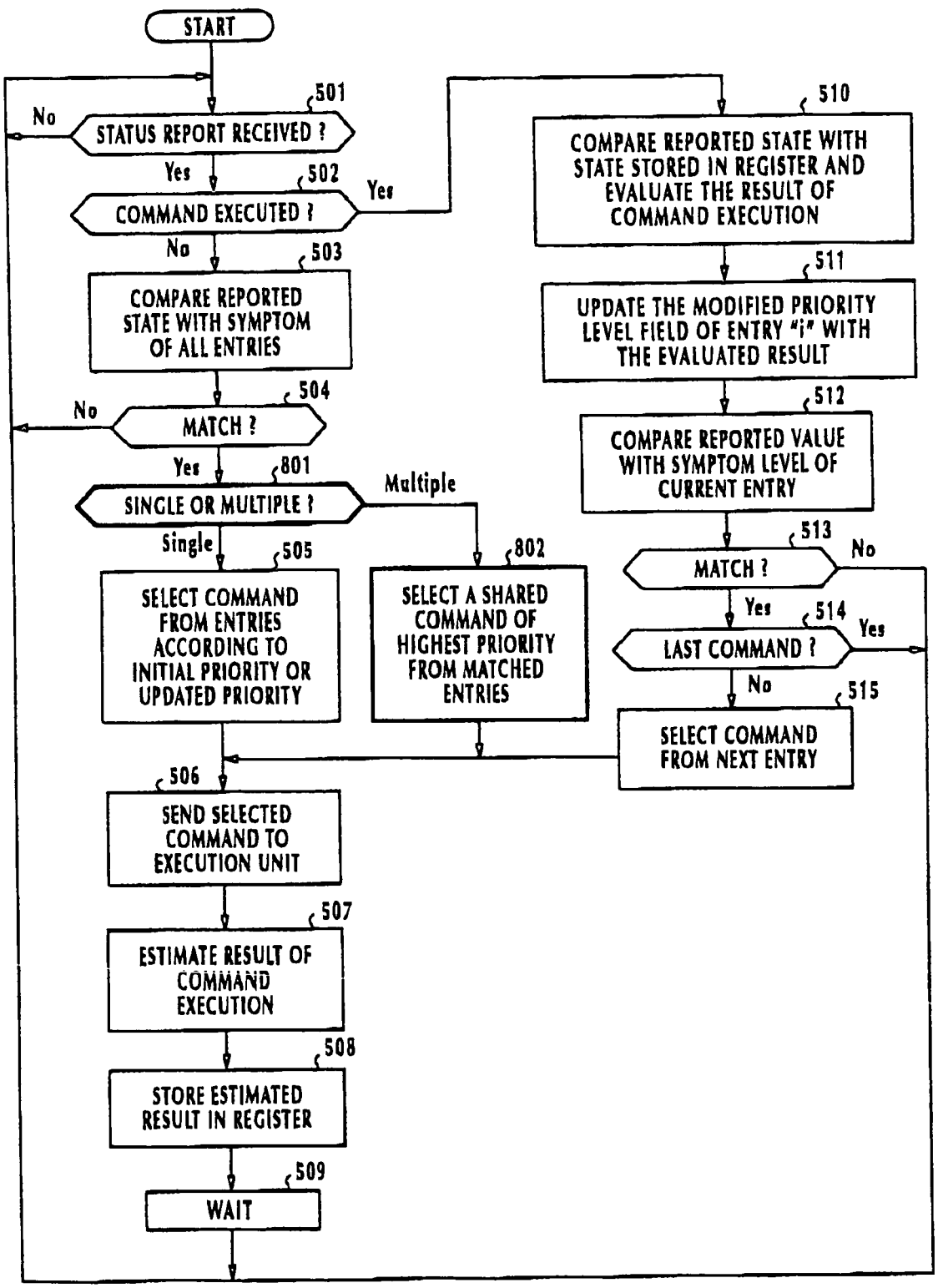
FIG. 8 is a flowchart of the operation of the command decision device according to a second embodiment of the present invention.

FIG. 8 is a flowchart of the operation of the command decision device 401 according to the second embodiment of the present invention in which a fault restoration command that is shared by multiple entries is selected when multiple status reports are received. FIG. 8 is generally similar to that shown in FIG. 5 and hence parts corresponding in significance to those of FIG. 5 are marked with the same numerals and the description thereof is omitted.

In FIG. 8, when at least one status report is received (step 501), the command decision device 401 navigates through steps 502 through 503 to step 504. If at least one operating state of the server indicated in the received status report or reports matches the symptom of at least one entry, flow proceeds from step 504 to step 801 to determine if the received status report is a single report or multiple reports. If the command decision device 401 has received a single report, flow proceeds to step 505 to select a command from the entry of highest priority (preset order) if an updated priority level is not available or according to an updated priority level if available. If the command decision device 401 has received multiple reports, flow proceeds to step 802 to search the memory for commands commonly shared by the matched entries and selects a command from the entry whose priority is highest of the entries sharing the commands. Flow proceeds from step 802 to step 506 for transmitting the selected command to the command execution unit 107.

The operation of the command decision device 401 of the third embodiment will be described below with reference to FIG. 9. FIG. 9 shows the contents of the memory 402 which will successively vary as indicated in the form of tables 402-10 and 402-11 or 402-12 (where the table 402-10 is a copy of the table 402-9).

Assume that the command decision device 401 receives multiple status reports indicating the occurrences of low memory and abnormal application output conditions. Command decision device 401 recognizes that the reported states match the entries #1 through #5 (step 504, FIG. 8). As indicated in the table 402-10, the Reboot Application and Reboot OS commands are commonly shared commands of the entries #1 through #4. Since the priority of the entry #2 is highest of the priority levels of the entries #1 through #4, the command decision device 401 selects the Reboot OS command is selected for execution in precedence over the Reboot Application command (steps 801, 802, 506). At step 507, the command decision device 401 will estimate that "the remaining memory is higher than 20% and the output of the application is normal" and stores the estimated conditions in the register 403 at step 508.

When the command decision device 401 subsequently receives multiple status reports, it compares the reported states with the states stored in the register 403 at step 510 and evaluates the results of the comparisons. If the low memory and abnormal application output problems have been solved by the execution of the Reboot OS command, the priority levels of entries #2 and #4 are both raised from the previous values 60 and 30 to new values 70 and 40, respectively, as indicated in a table 402-11.

On the other hand, if the low memory condition is the only trouble that has been solved by the execution of the Reboot OS command, the priority level of entry #2 is raised from 60 to 70, while that of entry #4 is lowered from 30 to 20, as indicated in a table 402-12. Since the abnormal application output condition still exists in the server, the fault detector will send a status report. In response, the command decision device 401 makes a search through entries #3, #4 and #5. Since the table 402-12 indicates that the priority of entry #5 is highest of the entries #3, #4 and #5, the command decision device 401 will select the Change Disks command from the entry #5 when it subsequently receives a status report.

In a third embodiment of the present invention, the memory 402 is modified as shown in FIG. 10. In this modification, success values (or status variables) are used for determining a command to be executed, instead of using the priority levels of the previous embodiments. Each entry of the memory 402 includes a "before" field 1001, an "after" value field 1002 and a "success value" field 1003. The "before" field 1001 indicates a reported state contained in an initial status report the command decision device 401 receives before a command is executed therefor, and the "after" field 1002 indicates a reported state contained in a subsequent status report the command decision device 401 receives after that command was executed. The "success field" 1003 indicates the amount of increase in symptom value gained by the execution of a command. Specifically, a success value of an entry is obtained by subtracting a value in the "before" field of the entry from a value in the "after" field of the entry. Initially, the success value field of all entries is set equal to zero. The success value of each entry will vary as the command decision device 401 performs command executions. Note that the previous symptom of abnormal AP output of the entries #3, #4 and #5 are replaced with CPU usage>50%.

Figure 11:
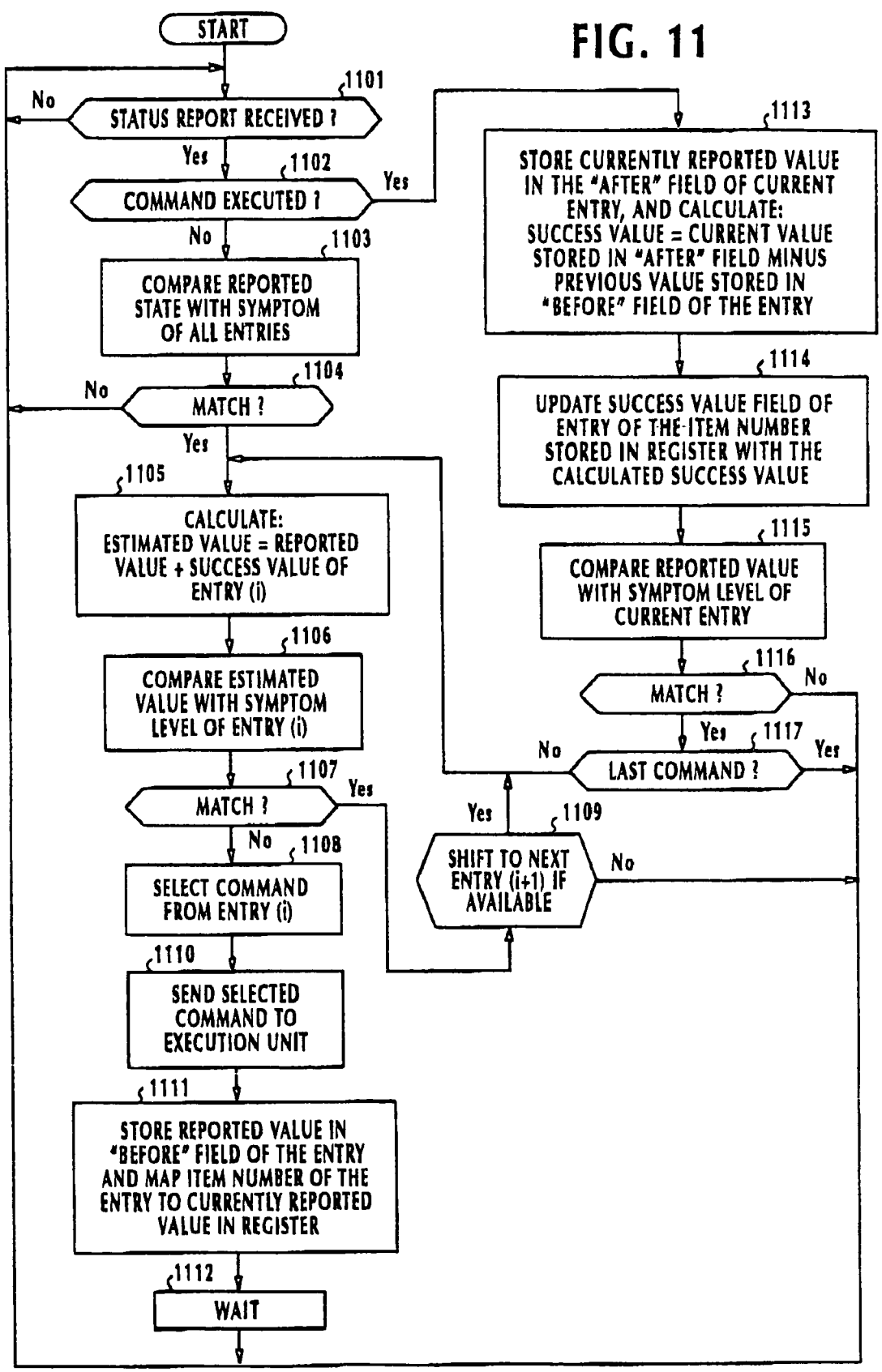
FIG. 11 is a flowchart of the operation of the operation of the command decision device according to the third embodiment.

In the third embodiment, the command decision device 401 operates according to the flowchart of FIG. 11.

When the command decision device 401 receives a status report from the fault detector at step 1101, it executes decision steps 1102, 1103 and 1104 in the same way as it executed steps 502, 503 and 504 in FIG. 5, and proceeds to step 1105 to calculate an estimated value for each of the matched entries by summing a reported value contained in the received status report with a success value of the entry. At step 1106, the command decision device 401 compares the estimated value with the symptom level of the first entry (i) of the same symptom to determine if they match or mismatch (step 1107). If a mismatch is detected, it is determined that the abnormal condition of the server may be solved with the execution of the command of the entry (i) and flow proceeds from step 1107 to step 1108 to select a command from the entry (i). If a match is detected, it is determined that the abnormal condition may not be solved by the command of entry (i) and flow proceeds to step 1109 to determine if the next entry (i+1) is available for the same symptom. If not, flow returns to the starting point of the routine, and if available, the pointer (i) is incremented by 1 and flow returns to step 1105 to calculate the estimated value of the next entry. Therefore, steps 1105 to 117 are repeated for all entries of the same symptom. Note that if the success value is initially unknown, the command decision device 401 selects entry #1 (step 1108). At step 1110, the selected command is transmitted to the command execution unit. At step 1111, the symptom value contained in the received status report is set in the "before" field of the entry and the item number of the entry is mapped to the reported value in the register 403. Flow returns to step 1101 after a predetermined waiting interval (step 1112).

The command decision device 401 subsequently receives a status report indicating a result of the execution of the transmitted command (step 1101) and navigates through step 1102 to step 1113 to store the symptom value contained in the received response report into the "after" field of the current entry and calculates a success value by subtracting the previous value stored in the "before" field 1001 from the current value stored in the "after" field 1002. At step 1114, the success value field of the entry whose item number is mapped in the status register 403 is updated with the calculated success value. Following the execution of step 1114, a comparison is made between the reported value with the symptom level of the current entry at step 1115 for detecting a match or a mismatch (step 1116). If a match is detected at step 1116, flow proceeds to step 1117 to check to see if the command executed is not the last command for the same symptom and steps 1105 to 1112 are repeated. If the executed command is the last command, flow returns to the starting point of the routine. If a mismatch is detected at step 1116, flow returns to step 1101, recognizing that the previous command execution was successful.

As described below, the memory 402 of FIG. 10 is successively updated to optimize the order of command execution as shown in FIG. 12.

When a first low memory status report is initially received with the success value field of the memory 402 being all unknown (FIG. 10), the command decision device 401 selects the Reboot Application command of entry #1 for transmission (step 1110) and stores the reported value of 18% in the "before" field 1001 of entry #1 (step 1108) as indicated in a table 402-21, FIG. 12, and maps the item number of the entry #1 to the currently reported value of 18% in the register 403 (step 1111).

When a second low memory status report is received from the fault detector as a reply message in response to the execution of Reboot Application command (step 1101), the command decision device 401 navigates through steps 1102 to step 1113. If the status report indicates that the remaining memory is increased to 25%, the command decision device 401 stores the 25% value in the "after" field 1002 of entry #1 (see table 402-21, FIG. 12) and obtains a success value of 7% by subtracting the value of "before" field from the value of "after" field and sets the success value in the success value field 1003 of entry #1 (step 1114). Flow proceeds to step 1115 to compare the reported 25% value with the less-than-20% reference level. Since they mismatch, it is determined that the abnormal condition has been corrected and flow returns to step 1101.

While the table 402-21 represents a success case by executing a single command, tables 402-22 and 402-23 illustrate another example in which the execution of a first command fails but the execution of a second command succeeds.

With the success value 7% being set in the entry #1 (see table 402-22), if the command decision device 401 receives a third low memory status report (step 1101), it navigates through step 1102 to step 1105 to calculate an estimated value. Assume that the third status report contains a remaining memory of 15% value. Since the estimated value is equal to the sum of 15%+7% and this value does not match the decision criteria of less-than-20% value (steps 1106, 1107), it is determined that the Reboot Application command of entry #1 can save the current low memory state and hence this command is selected at step 1108, and transmitted at step 1110 for execution and the "before" field of entry #1 is updated from 18% to 15% (step 1111).

If the command decision device 401 subsequently receives a fourth status report (step 1101) in response to the execution of the Reboot Application command, it proceeds to step 1102 and branches out to step 1113. If the report contains a remaining memory of 21% value, the command decision device 401 sets the 21% value in the "after" field of entry #1 and updates the success value field 1003 of entry #1 from 7% to 6% (as indicated in the table 402-22). Since the reported value of 21% results in the detection of a mismatch at step 1116, flow returns to the starting point of the routine, recognizing that the execution of the Reboot Application command was successful.

If the command decision device 401 receives a fifth status report containing a remaining memory of 12%, the command decision device 401 navigates through steps 1102 to 1103 to step 1104. Since the reported value results in the detection of a match, flow proceeds to step 1105 to calculate a sum of the reported value of 12% and the success value of 6% to produce an estimated value 18%. Since this estimated value matches the less-than-20% condition, the decision at step 1107 is affirmative and the command decision device 401 proceeds to step 1109 to check to see if the next entry is available. In this case, the next entry #2 is available for the low memory condition Thus, the pointer (i) is incremented to "2" at step 1109 and flow returns to step 1105 to calculate the estimated value of the entry #2. Since the success value of entry #2 is 0, the estimated value is equal to 12%. The decision at step 1107 thus results in a negative decision and flow proceeds to step 1108 to select the Reboot OS command from the next entry #2, and transmits it to the command execution unit (step 1110) and sets the 12% value in the "before" field of entry #2 at step 1111 (see table 402-23).

If a sixth status report which is received in response to the execution of the Reboot OS command contains a remaining memory of 50%, the command decision device 401 navigates through steps 1102 to 1113 again. The reported value of 50% is set in the "after" field 1002 of entry #2 and a success value of 38% is set in the success value field 1003 of entry #2 (see table 402-23). Since the reported value of 50% results in the detection of a mismatch at step 1116, flow returns to step 1101, recognizing that the previous execution of the Reboot OS command is successful for shooting the low memory problem.

FIG. 13 illustrates the memory of FIG. 4 according to a fourth embodiment of the present invention. In this embodiment, a priority level field 1301 is additionally provided for indicating a priority level in each of the entries in combination with the memory contents of FIG. 10.

Figure 14:
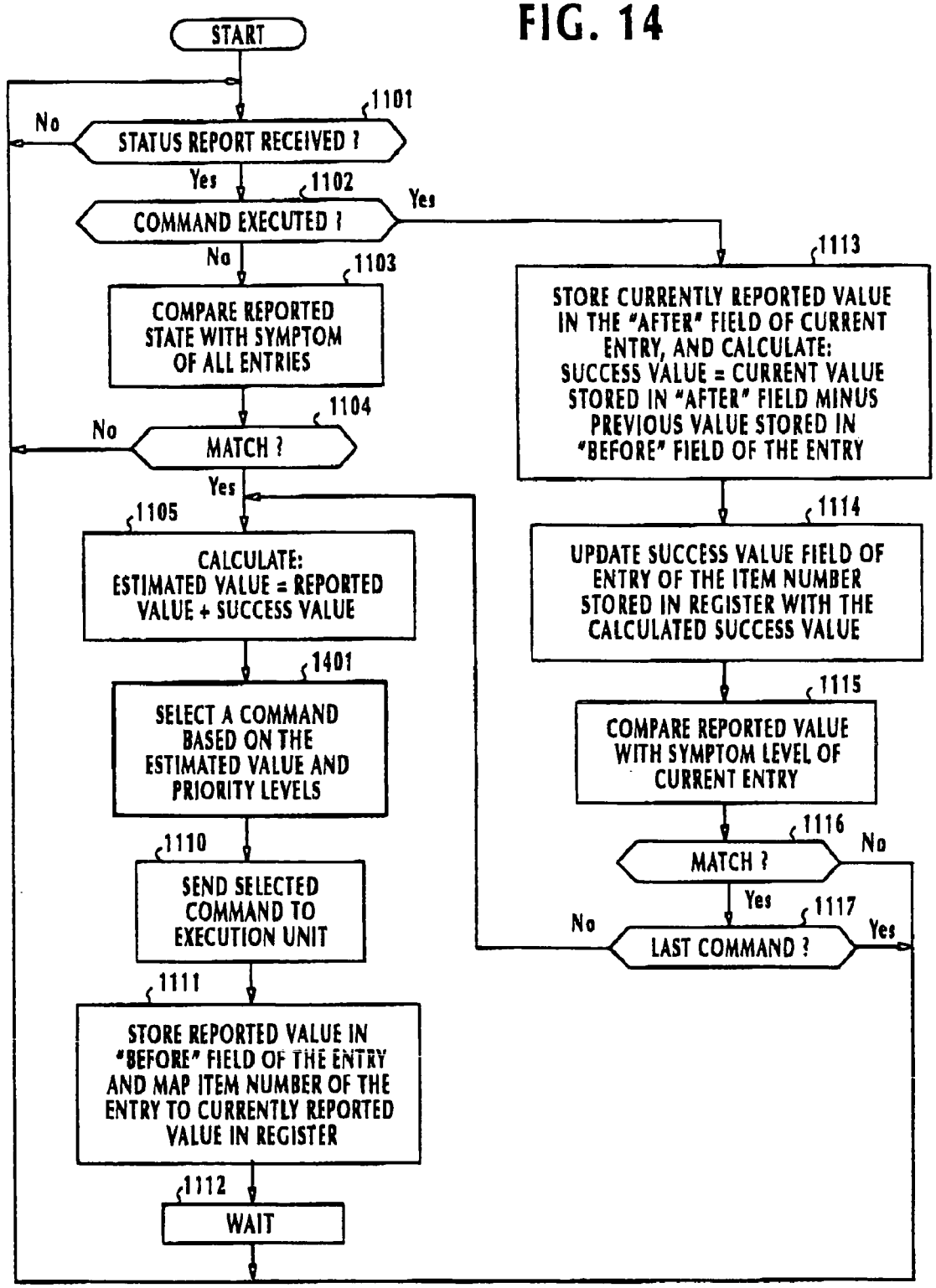
FIG. 14 is a flowchart of the operation of the command decision device of FIG. 4 according to the fourth embodiment.

FIG. 14 is a flowchart of the operation of the command decision device 401 according to the fourth embodiment. FIG. 14 is generally similar to the flowchart of FIG. 11 with the exception that command selection step 1401 is provided instead of steps 1107, 1108 and 1109 of FIG. 11. Following calculation step 1105, step 1401 is performed by selecting a fault restoration command from one of the matched entries based on the estimated value calculated at step 1105 and the priority levels retrieved from the matched entries of the memory. The selected command is then transmitted to the execution unit (step 1110).

What is claimed is:

1. A fault recovery system comprising:
    fault detecting means for transmitting a status report indicating an operating condition of a data processing apparatus;
    command execution means for executing a command in said data processing apparatus;
    a store for defining a plurality of entries and mapping in each of said entries one of a plurality of reference fault conditions of said data processing apparatus to one of a plurality of fault restoration commands and one of a plurality of priority levels; and
    decision means, responsive to a status report from said fault detecting means, for detecting one of said reference fault conditions which corresponds to a fault condition indicated in the status report, selecting one of said fault restoration commands according to the priority levels of the entries which correspond to the detected reference fault condition, transmitting the selected command to said command execution means, and estimating a result of the execution of the transmitted command;
    said decision means being further responsive to a subsequent status report from said fault detecting means for making a comparison between said estimated result and a fault condition indicated in the subsequent status report and updating said priority levels according to a result of the comparison.

2. The fault recovery system of claim 1, wherein said decision means is configured to select one of said fault restoration commands from an entry whose priority level is lower than the priority level of the entry from which a fault restoration command was previously selected, if the fault condition indicated in said subsequent status report still corresponds to said one reference fault condition.

3. The fault recovery system of claim 2, wherein said decision means is responsive to multiple status reports from said fault detecting means for detecting a plurality of said reference fault conditions which correspond to fault conditions indicated in said multiple status reports, selecting one of said fault restoration commands which is commonly shared by a plurality of entries of said detected reference fault conditions, and transmitting the selected command to said command execution means.

4. The fault recovery system of claim 1, wherein said decision means is responsive to multiple status reports from said fault detecting means for detecting a plurality of said reference fault conditions which correspond to fault conditions indicated in said multiple status reports, selecting one of said fault restoration commands which is commonly shared by a plurality of entries of said detected reference fault conditions, and transmitting the selected command to said command execution means.

5. A fault recovery system comprising.
   fault detecting means for transmitting a status report indicating a value of an operating condition of a data processing apparatus;
   command execution means for executing a command in said data processing apparatus;
   a store for defining a plurality of entries and mapping in each of said entries one of a plurality of reference values of operating conditions of said data processing apparatus to one of a plurality of fault restoration commands and one of a plurality of status variables; and
   decision means, responsive to a first status report from said fault detecting means, for detecting one of said reference values which corresponds to a value indicated in the status report, making an estimation of success or failure of command execution by calculating a sum of a status variable mapped to the detected reference value and the value of the first status report and comparing said sum with said detected reference value to produce an estimated value, selecting a fault restoration command from the entries in which the detected reference value is contained according to said estimated value, and transmitting the selected command to said command execution means,
   said decision means being further responsive to a second, subsequent status report from said fault detecting means for subtracting the value of the first status report from a value indicated in said second status report to produce a success value, and updating said calculated status variable with the success value.

6. The fault recovery system of claim 5, wherein said decision means is configured to determine whether there is a match or a mismatch between said sum and said detected reference value and select a fault restoration command from a first one of the entries in which the detected reference value is contained if said mismatch is detected or select a fault restoration command from a second one of said entries in which said detected reference value is contained if said match is detected.

7. The fault recovery system of claim 6, wherein said decision means is configured to perform said estimation again after said status variable is updated if there is a match between the value of said second status report and the detected reference value.

8. The fault recovery system of claim 5, wherein said decision means is configured to perform said estimation again after said status variable is updated if there is a match between the value of said second status report and the detected reference value.

9. A fault recovery system comprising:
   fault detecting means for transmitting a status report indicating a value of an operating condition of a data processing apparatus;
   command execution means for executing a command in said data processing apparatus;
   a store for defining a plurality of entries and mapping in each of said entries one of a plurality of reference values of operating conditions of said data processing apparatus to one of a plurality of fault restoration commands, one of a plurality of priority levels, and one of a plurality of status variables; and
   decision means, responsive to a first status report from said fault detecting means, for detecting one of said reference values which corresponds to a value indicated in the status report, making an estimation of success or failure of command execution by calculating a sum of a status variable mapped to the detected reference value and the value of the first status report and comparing said sum with said detected reference value to produce an estimated value, selecting a fault restoration command from said entries in which the detected reference value is contained according to said estimated value and the priority levels of said entries, and transmitting the selected command to said command execution means,
   said decision means being further responsive to a second, subsequent status report from said fault detecting means for subtracting the value of the first status report from a value indicated in said second status report to produce a success value, and updating said calculated status variable with the success value.

10. The fault recovery system of claim 9, wherein said decision means is configured to determine whether there is a match or a mismatch between said sum and said detected reference value and select a fault restoration command from a first one of the entries in which the detected reference value is contained if said mismatch is detected or select a fault restoration command from a second one of said entries in which said detected reference value is contained if said match is detected.

11. The fault recovery system of claim 10, wherein said decision means is configured to perform said estimation again after said status variable is updated if there is a match between the value of said second status report and the detected reference value.

12. The fault recovery system of claim 9, wherein said decision means is configured to perform said estimation again after said status variable is updated if there is a match between the value of said second status report and the detected reference value.

13. A fault recovery method for a data processing apparatus to which fault detecting means is connected for transmitting a status report indicating an operating condition of the data processing apparatus and to which a command execution means is further connected for executing a command in said data processing apparatus, the method comprising the steps of:
   a) defining a plurality of entries and mapping in each of said entries one of a plurality of reference fault conditions of said data processing apparatus to one of a plurality of fault restoration commands and one of a plurality of priority levels;

b) responsive to a status report from said fault detecting means, detecting one of said reference fault conditions which corresponds to a fault condition indicated in the status report;

c) selecting one of said fault restoration commands according to the priority levels of the entries which correspond to the detected reference fault condition and transmitting the selected command to said command execution means;

d) estimating a result of the execution of the transmitted command; and e) responsive to a subsequent status report from said fault detecting means for making a comparison between said estimated result and a fault condition indicated in the subsequent status report and updating said priority levels according to a result of the comparison.

14. The fault recovery method of claim 13, further comprising the step of selecting one of said fault restoration commands from an entry whose priority level is lower than the priority level of the entry from which a fault restoration command was previously selected, if the fault condition indicated in said subsequent status report still corresponds to said one reference fault condition.

15. The fault recovery method of claim 13, wherein step (b) comprises the step of:

receiving multiple status reports from said fault detecting means and detecting a plurality of said reference fault conditions which correspond to fault conditions indicated in said multiple status reports, and wherein step (c) comprises the steps of:

selecting one of said fault restoration commands which is commonly shared by a plurality of entries of said detected reference fault conditions; and transmitting the selected command to said command execution means.

16. A fault recovery method for a data processing apparatus to which fault detecting means is connected for transmitting a status report indicating an operating condition of the data processing apparatus and to which a command execution means is further connected for executing a command in said data processing apparatus, the method comprising the steps of:

a) defining a plurality of entries and mapping in each of said entries one of a plurality of reference values of operating conditions of said data processing apparatus to one of a plurality of fault restoration commands and one of a plurality of status variables;

b) responsive to a first status report from said fault detecting means, detecting one of said reference values which corresponds to a value indicated in the status report;

c) making an estimation of success or failure of command execution by calculating a sum of a status variable mapped to the detected reference value and the value of the first status report and comparing said sum with said detected reference value to produce an estimated value;

d) selecting a fault restoration command from the entries in which the detected reference value is contained according to said estimated value, and transmitting the selected command to said command execution means; and e) responsive to a second, subsequent status report from said fault detecting means for subtracting the value of the first status report from a value indicated in said second status report to produce a success value and updating said calculated status variable with the success value.

17. The fault recovery method of claim 16, further comprising the steps of:

determining whether there is a match or a mismatch between said sum and said detected reference value; and selecting a fault restoration command from a first one of the entries in which the detected reference value is contained if said mismatch is detected or selecting a fault restoration command from a second one of said entries in which said detected reference value is contained if said match is detected.

18. The fault recovery method of claim 16, further comprising the steps of, after step (e) is performed, making a second estimation of success or failure of command execution by calculating a sum of a status variable which is mapped to the detected reference value and the value of the first status report and comparing said sum with said detected reference value to produce an estimated value, if there is a match between the value of said second status report and the detected reference value.

19. A fault recovery method for a data processing apparatus to which fault detecting means is connected for transmitting a status report indicating an operating condition of the data processing apparatus and to which a command execution means is further connected for executing a command in said data processing apparatus, the method comprising the steps of:

a) defining a plurality of entries and mapping in each of said entries one of a plurality of reference values of operating conditions of said data processing apparatus to one of a plurality of fault restoration commands, one of a plurality of priority levels, and one of a plurality of status variables;

b) responsive to a first status report from said fault detecting means, detecting one of said reference values which corresponds to a value indicated in the status report;

c) making an estimation of success or failure of command execution by calculating a sum of a status variable mapped to the detected reference value and the value of the first status report and comparing said sum with said detected reference value to produce an estimated value;

d) selecting a fault restoration command from said entries in which the detected reference value is contained according to said estimated value and the priority levels of said entries and transmitting the selected command to said command execution means; and e) responsive to a second, subsequent status report from said fault detecting means, subtracting the value of the first status report from a value indicated in said second status report to produce a success value, and updating said calculated status variable with the success value.

20. The fault recovery method of claim 19, further comprising the steps of:

determining whether there is a match or a mismatch between said sum and said detected reference value; and selecting a fault restoration command from a first one of the entries in which the detected reference value is contained if said mismatch is detected or selecting a fault restoration command from a second one of said entries in which said detected reference value is contained if said match is detected.

21. The fault recovery method of claim 19, further comprising the steps of, after step (e) is performed, making a second estimation of success or failure of command execution by calculating a sum of a status variable which is mapped to the detected reference value and the value of the first status report and comparing said sum with said detected reference value to produce an estimated value, if there is a match between the value of said second status report and the detected reference value.

22. A storage medium containing a computer-executable program for recovering a data processing apparatus from failure, wherein fault detecting means is connected to the data processing apparatus for transmitting a status report indicating an operating condition of the data processing apparatus and wherein command execution means is further connected for executing a command in said data processing apparatus, the program comprising the steps of:
 a) defining a plurality of entries and mapping in each of said entries one of a plurality of reference fault conditions of said data processing apparatus to one of a plurality of fault restoration commands and one of a plurality of priority levels;
 b) responsive to a status report from said fault detecting means, detecting one of said reference fault conditions which corresponds to a fault condition indicated in the status report;
 c) selecting one of said fault restoration commands according to the priority levels of the entries which correspond to the detected reference fault condition and transmitting the selected command to said command execution means;
 d) estimating a result of the execution of the transmitted command; and
 e) responsive to a subsequent status report from said fault detecting means for making a comparison between said estimated result and a fault condition indicated in the subsequent status report and updating said priority levels according to a result of the comparison.

23. The storage medium of claim 22, further comprising the step of selecting one of said fault restoration commands from an entry whose priority level is lower than the priority level of the entry from which a fault restoration command was previously selected, if the fault condition indicated in said subsequent status report still corresponds to said one reference fault condition.

24. The storage medium of claim 22, wherein step (b) comprises the step of:
 receiving multiple status reports from said fault detecting means and detecting a plurality of said reference fault conditions which correspond to fault conditions indicated in said multiple status reports, and
 wherein step (c) comprises the steps of:
 selecting one of said fault restoration commands which is commonly shared by a plurality of entries of said detected reference fault conditions; and
 transmitting the selected command to said command execution means.

25. A storage medium containing a computer-executable program for recovering a data processing apparatus from failure, wherein fault detecting means is connected to the data processing apparatus for transmitting a status report indicating an operating condition of the data processing apparatus and wherein command execution means is further connected for executing a command in said data processing apparatus, the program comprising the steps of:
 a) defining a plurality of entries and mapping in each of said entries one of a plurality of reference values of operating conditions of said data processing apparatus to one of a plurality of fault restoration commands and one of a plurality of status variables;
 b) responsive to a first status report from said fault detecting means, detecting one of said reference values which corresponds to a value indicated in the status report;
 c) making an estimation of success or failure of command execution by calculating a sum of a status variable mapped to the detected reference value and the value of the first status report and comparing said sum with said detected reference value to produce an estimated value;
 d) selecting a fault restoration command from the entries in which the detected reference value is contained according to said estimated value, and transmitting the selected command to said command execution means; and
 e) responsive to a second, subsequent status report from said fault detecting means for subtracting the value of the first status report from a value indicated in said second status report to produce a success value and updating said calculated status variable with the success value.

26. The storage medium of claim 25, further comprising the steps of:
 determining whether there is a match or a mismatch between said sum and said detected reference value; and
 selecting a fault restoration command from a first one of the entries in which the detected reference value is contained if said mismatch is detected or selecting a fault restoration command from a second one of said entries in which said detected reference value is contained if said match is detected.

27. The storage medium of claim 25, further comprising the steps of, after step (e) is performed, making a second estimation of success or failure of command execution by calculating a sum of a status variable which is mapped to the detected reference value and the value of the first status report and comparing said sum with said detected reference value to produce an estimated value, if there is a match between the value of said second status report and the detected reference value.

28. A storage medium containing a computer-executable program for recovering a data processing apparatus from failure, wherein fault detecting means is connected to the data processing apparatus for transmitting a status report indicating an operating condition of the data processing apparatus and wherein command execution means is further connected for executing a command in said data processing apparatus, the program comprising the steps of:
 a) defining a plurality of entries and mapping in each of said entries one of a plurality of reference values of operating conditions of said data processing apparatus to one of a plurality of fault restoration commands, one of a plurality of priority levels, and one of a plurality of status variables;
 b) responsive to a first status report from said fault detecting means, detecting one of said reference values which corresponds to a value indicated in the status report;
 c) making an estimation of success or failure of command execution by calculating a sum of a status variable mapped to the detected reference value and the value of the first status report and comparing said sum with said detected reference value to produce an estimated value;
 d) selecting a fault restoration command from said entries in which the detected reference value is contained according to said estimated value and the priority levels of said entries and transmitting the selected command to said command execution means; and
 e) responsive to a second, subsequent status report from said fault detecting means, subtracting the value of the first status report from a value indicated in said second status report to produce a success value, and updating said calculated status variable with the success value.

29. The storage medium of claim 28, further comprising the steps of:

determining whether there is a match or a mismatch between said sum and said detected reference value; and selecting a fault restoration command from a first one of the entries in which the detected reference value is contained if said mismatch is detected or selecting a fault restoration command from a second one of said entries in which said detected reference value is contained if said match is detected.

30. The storage medium of claim 28, further comprising the steps of, after step (e) is performed, making a second estimation of success or failure of command execution by calculating a sum of a status variable which is mapped to the detected reference value and the value of the first status report and comparing said sum with said detected reference value to produce an estimated value, if there is a match between the value of said second status report and the detected reference value.

* * * * *